(12) United States Patent
Aschauer et al.

(10) Patent No.: US 12,192,348 B2
(45) Date of Patent: Jan. 7, 2025

(54) KEY MANAGEMENT IN AN INTEGRATED CIRCUIT

(71) Applicant: Siemens Aktiengesellschaft, Munich (DE)

(72) Inventors: Hans Aschauer, Munich (DE); Rainer Falk, Poing (DE); Christian Peter Feist, Munich (DE); Steffen Fries, Baldham (DE); Aliza Maftun, Munich (DE); Hermann Seuschek, Munich (DE); Thomas Zeschg, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 569 days.

(21) Appl. No.: 17/432,153

(22) PCT Filed: Feb. 14, 2020

(86) PCT No.: PCT/EP2020/053900
§ 371 (c)(1),
(2) Date: Aug. 19, 2021

(87) PCT Pub. No.: WO2020/169470
PCT Pub. Date: Aug. 27, 2020

(65) Prior Publication Data
US 2022/0191010 A1  Jun. 16, 2022

(30) Foreign Application Priority Data
Feb. 21, 2019 (EP) .................................. 19158503

(51) Int. Cl.
*H04L 9/08* (2006.01)
(52) U.S. Cl.
CPC ................................. *H04L 9/088* (2013.01)

(58) Field of Classification Search
CPC ...... H04L 9/088; H04L 9/0643; H04L 9/0841; G06F 21/76; G06F 21/57
See application file for complete search history.

(56) References Cited

U.S. PATENT DOCUMENTS

| | | | | |
|---|---|---|---|---|
| 2008/0123843 | A1* | 5/2008 | Machani | H04L 9/3228 380/44 |
| 2009/0262926 | A1* | 10/2009 | Kabra | G06F 21/73 707/999.1 |

(Continued)

FOREIGN PATENT DOCUMENTS

| | | |
|---|---|---|
| CN | 103378966 A | 10/2013 |
| CN | 103544417 A | 1/2014 |

(Continued)

OTHER PUBLICATIONS

European Search Report for European Application No. 19158503.3-1218 dated Aug. 1, 2019.

(Continued)

*Primary Examiner* — Han Yang
(74) *Attorney, Agent, or Firm* — Lempia Summerfield Katz LLC

(57) ABSTRACT

A method for key management in a field-programmable integrated part of an integrated circuit is disclosed herein. According to the method, a hardware configuration for the field-programmable integrated part is loaded into the field-programmable integrated part. The hardware configuration includes a key derivation functionality. Further, using the key derivation functionality, a cryptographic key is derived based on information provided in the field-programmable integrated part.

19 Claims, 4 Drawing Sheets

(56) References Cited

U.S. PATENT DOCUMENTS

| | | | | |
|---|---|---|---|---|
| 2009/0300366 A1* | 12/2009 | Gueller | ................... | G06F 21/51 |
| | | | | 713/189 |
| 2013/0346759 A1* | 12/2013 | LaMacchia | ............. | G06F 21/72 |
| | | | | 713/189 |
| 2018/0365411 A1 | 12/2018 | Falk et al. | | |
| 2022/0012338 A1* | 1/2022 | Järvinen | ............... | H04L 9/0822 |

FOREIGN PATENT DOCUMENTS

| | | | | |
|---|---|---|---|---|
| CN | 112532391 A * | 3/2021 | ............. | H04L 9/083 |
| DE | 102015225270 A1 | 6/2017 | | |
| EP | 3881215 A1 | 9/2021 | | |
| WO | WO-2017102295 A1 * | 6/2017 | ............. | G06F 21/44 |

OTHER PUBLICATIONS

PCT International Search Report and Written Opinion of International Searching Authority mailed May 25, 2020 corresponding to PCT International Application No. PCT/EP2020/053900.
Trimberger, Stephen M., and Jason J. Moore. "FPGA security: Motivations, features, and applications." Proceedings of the IEEE 102.8 (2014): 1248-1265.

* cited by examiner

KEY MANAGEMENT IN AN INTEGRATED CIRCUIT

The present patent document is a § 371 nationalization of PCT Application Serial No. PCT/EP2020/053900, filed Feb. 14, 2020, designating the United States, which is hereby incorporated by reference, and this patent document also claims the benefit of European Patent Application No. 19158503.3, filed Feb. 21, 2019, which is also hereby incorporated by reference.

TECHNICAL FIELD

The present disclosure relates to a method for key management in an integrated circuit, in particular in a field-programmable integrated part of an integrated circuit. The field-programmable integrated part may include a field-programmable integrated circuit included in a system on a chip (SoC), or the field-programmable integrated part may be a part of a field-programmable integrated circuit including further integrated circuits such as a processing unit or a further field-programmable integrated part.

BACKGROUND

Applications, also known as Apps, which may be installed and updated independently of a basic software system such as known from mobile phones or tablet computers, may also be supported on industrial devices (also known as App-enabled Field Device, App-enabled Edge Cloud). For certain reasons, (e.g., performance, power consumption, real-time behavior, and key management), it may be advantageous to use a so-called "Hardware App". A Hardware App (HW App) may be loaded into a reconfigurable digital chip, digital circuit, or digital module, (e.g., a Field-Programmable Gate Array (FPGA), a Complex Programmable Logic Device (CPLD), an Application Specific Integrated Circuit (ASIC) with embedded FPGA or CPLD, or a System on a Chip (SoC) with embedded FPGA or CPLD). A Hardware App may partially define the configuration of the digital chip or module, also known as Partial Reconfiguration. A HW App may be operated stand alone or may be operated as part of an "App Bundle" including Software App and Hardware App and their configuration parameters. The concept of HW Apps may be utilized in order to outsource computation-intensive tasks to hardware. HW Apps may also perform cryptographic operations in which the underlying key may be better protected from being compromised by malicious software than in a pure software-based solution.

However, communication of the Hardware App with entities outside the Hardware App, (e.g., the assigned Software App components of an App Bundle or another Hardware App of another App Bundle or memory outside the reconfigurable digital chip or module), may be compromised.

SUMMARY

Therefore, there is a need in the art for protecting external communication of a Hardware App.

This object is achieved by a method for key management in a field-programmable integrated part of an integrated circuit, a system including a field-programmable integrated part of an integrated circuit, and a hardware configuration for a field-programmable integrated part of an integrated circuit as disclosed herein.

The scope of the present disclosure is defined solely by the appended claims and is not affected to any degree by the statements within this summary. The present embodiments may obviate one or more of the drawbacks or limitations in the related art.

According to an aspect, a method for key management in a field-programmable integrated part of an integrated circuit is provided. The integrated circuit may include a Field-Programmable Gate Array (FPGA), a Complex Programmable Logic Device (CPLD), an Application Specific Integrated Circuit (ASIC) with embedded FPGA or CPLD, or a System on a Chip (SoC) with embedded FPGA or CPLD. According to the method, a hardware configuration for the field-programmable integrated part is loaded into the field-programmable integrated part. The hardware configuration may be considered as a Hardware App, which is loaded into the field-programmable integrated part, for example, for providing computation-intensive tasks. The hardware configuration includes a key derivation functionality. The key derivation functionality may include a key agreement functionality. A cryptographic key is derived based on information provided in the field-programmable integrated part using the key derivation functionality. The key derivation functionality may include a functionality implemented in the field-programmable integrated part and relying on information provided in the integrated circuit, for example, secret and/or unique information which cannot be read out from outside the integrated circuit. The key derivation and agreement functionality may include a Diffie-Hellmann key agreement method, also called Diffie-Hellmann key exchange method. The Diffie-Hellman key agreement (DH) is a method of securely exchanging cryptographic keys over a public (not protected) channel. By implementing the key derivation functionality in the field-programmable integrated part using information provided in the integrated circuit, the derived keys are bound to the hardware and it may be assured that the key exchange is bound to the hardware, e.g., performed at least partially by the hardware logic.

According to an embodiment, the hardware configuration includes a control functionality for controlling operation of an application implemented by the field-programmable integrated part using the cryptographic key. In particular, a control functionality for controlling communication of an application implemented by the field-programmable integrated part may use the cryptographic key for protecting data communicated between the field-programmable integrated part and an entity outside the field-programmable integrated part. The entity outside the field-programmable integrated part may include a Software App assigned to the Hardware App and executed by a processor coupled to the integrated circuit. Additionally, or as an alternative, the entity outside the field-programmable integrated part may include a memory for storing information of the field-programmable integrated part, or the entity outside the field-programmable integrated part may include a further field-programmable integrated part of the integrated circuit.

According to various examples, the information provided in the field-programmable integrated part includes at least one of a hardware application identifier, a hardware identifier, a hardware system key, a part of a bitstream of the hardware configuration, a fingerprint of the bitstream of the hardware configuration, and a secret system parameter. The hardware application identifier (HW-App-ID) may be integrated in the hardware configuration loaded into the field-programmable integrated part. The hardware application identifier may be assigned when installing the hardware configuration in the field-programmable integrated part or may be part of the hardware configuration. The hardware identifier, (e.g., a hardware serial number (HW-SN)), may be included in the field-programmable integrated part. The hardware identifier may uniquely identify the field-programmable integrated part. The hardware identifier may be secret such that it cannot be read out from outside of the field-programmable integrated part. The hardware system key (HW-SK) may be provided by an application associated to the hardware configuration, for example, a logic of the integrated circuit for downloading the hardware configuration and initiating operation of the downloaded hardware configuration. The hardware system key may be secret. The part of the bitstream of the hardware configuration and the fingerprint of the bitstream of the hardware configuration both rely on data constituting the hardware configuration and may therefore be considered as hardware configuration bitstream related key information (HW-BK). The part of the bitstream of the hardware configuration may include a specific part of the bitstream of the hardware configuration loaded into the field-programmable integrated part. The fingerprint of the bitstream of the hardware configuration may be generated, for example, using a hash function such as SHA256. The secret system parameter (HW-SP) may be included in the integrated circuit and may be accessible from the field-programmable integrated part only. Using the above listed information provides a binding of the derived cryptographic key to the Hardware App and the integrated circuit hardware.

According to further embodiments, a cryptographic operation is performed in the field-programmable integrated part using the derived cryptographic key. For example, the derived cryptographic key may be used for deriving further direction specific cryptographic keys for corresponding communication connections of the Hardware App with an entity outside the field-programmable integrated part. The direction specific cryptographic keys may be derived using a Diffie Hellman secret, established when performing the Diffie Hellman protocol as the key agreement functionality. Based on the direction specific keys, further security service specific keys may be derived, for example, separate keys for integrity protection and confidentiality.

In various examples, deriving the cryptographic key includes applying a hash function on the information provided in the field-programmable integrated part, (e.g., a hash key derivation function (HKDF), a keyed hash function like a hash-based message authentication code (HMAC) using a cryptographic hash function like secure hash algorithm such as SHA256, or a symmetric algorithm in MAC mode such as according to the advanced encryption standard (e.g. AES-128-GMAC)).

In further examples, the derived cryptographic key may be used in connection with storing data of the field-programmable integrated part in a memory outside the field-programmable integrated part and retrieving the data from the memory. The memory may include a (non-volatile) flash memory or a (volatile) random access memory (RAM). For example, encrypted data may be generated in the field-programmable integrated part using the cryptographic key and the encrypted data may be transmitted to the memory remote from the field-programmable integrated part. Likewise, encrypted data may be received from the memory remote from the field-programmable integrated part, and the encrypted data may be decrypted in the field-programmable integrated part using the cryptographic key. As the cryptographic key relies on hardware specific and/or Hardware App specific parameters and is provided in the field-programmable integrated part only, decrypting the encrypted data of the field-programmable integrated part outside the field-programmable integrated part may be reliably prohibited.

According to a further embodiment, the hardware configuration is loaded into a first field-programmable integrated part of the integrated circuit, and a further hardware configuration is loaded into a second field-programmable integrated part of the integrated circuit. The second field-programmable integrated part may be separated from the first field-programmable integrated part. However, the first field-programmable integrated part and the second field-programmable integrated part may be arranged in a same entity or in different entities of the integrated circuit. For example, the first field-programmable integrated part and the second field-programmable integrated part may be arranged in a same field-programmable gate array or in different field-programmable gate arrays. The further hardware configuration includes a further key derivation functionality. A further cryptographic key is derived by the further key derivation functionality based on further information provided in the second field-programmable integrated part. The further information provided in the second field-programmable integrated part may include information which is different from the information provided in the first field-programmable integrated part, for example, a different hardware application identifier of the further hardware configuration, and a different part or fingerprint of a bitstream of the further hardware configuration. However, the further information provided in the second field-programmable integrated part may include information which is the same as the information provided in the first field-programmable integrated part, (e.g., the hardware identifier, the secret system parameter, and the hardware system key). Thus, the key derivation functionality and the further key derivation functionality may rely on at least partially the same secret information, (e.g., the hardware identifier and the hardware system key), thus sharing a secret.

According to various examples, a session key for protecting messages communicated between the first field-programmable integrated part and the second field-programmable integrated part may be generated using a key agreement protocol in the first field-programmable integrated part and the second field-programmable integrated part. The key agreement protocol may include the Diffie Hellman key exchange protocol. Protecting messages may include providing an integrity protection and/or confidentiality of the data included in the messages.

The session key may include a first directional session key for protecting messages communicated from the first field-programmable integrated part to the second field-programmable integrated part. Furthermore, the session key may include a second directional session key for protecting messages communicated from the second field-programmable integrated part to the first field-programmable integrated part. The second directional session key may be different than the first directional session key. Additionally, or as an alternative, a single same session key may be established and used for communicating messages from the first field-programmable integrated part to the second field-programmable integrated part and vice versa.

According to a further embodiment, the messages of the key agreement protocol communicated from the first field-programmable integrated part to the second field-programmable integrated part may be protected using the cryptographic key. Likewise, the messages of the key agreement protocol communicated from the second field-programmable integrated part to the first field-programmable integrated part may be protected using the further cryptographic key. Thus, already the key agreement protocol may be protected, (e.g., in the meaning of integrity protection), based on the cryptographic key and the further cryptographic key. In particular, the above shared secret may contribute to establish protection of the messages of the key agreement protocol.

According to various examples, protecting messages may include at least one of the following: encrypting the messages, decrypting the messages, and protecting integrity of the messages. Encrypting and decrypting the messages may contribute to assure confidentiality.

According to a further aspect, a system including a field-programmable integrated part of an integrated circuit is provided. The field-programmable integrated part is configured to load a hardware configuration for the field-programmable integrated part into the field-programmable integrated part. The hardware configuration includes a key derivation functionality enabling the field-programmable integrated part to perform a key derivation function. A cryptographic key is derived by the key derivation functionality based on information provided in the field-programmable integrated part. The system may be a system on a chip (SoC) and may include an integrated circuit including a processor and a field-programmable integrated circuit. The system may include further components, for example, memory and interfaces.

The system may be configured to perform the above described method and the embodiments thereof and includes therefore the above described advantages.

Another aspect relates to a hardware configuration for a field-programmable integrated part of an integrated circuit. The hardware configuration may be loaded into the field-programmable integrated part. The hardware configuration causes the field-programmable integrated part to perform a method for key management. The method for key management may include the above described method and the embodiments thereof.

It is to be understood that the features mentioned above and those yet to be explained below may be used not only in the respective combinations indicated, but also in other combinations or in isolation without departing from the scope of the disclosure.

DETAILED DESCRIPTION OF EMBODIMENTS

Figure 1:
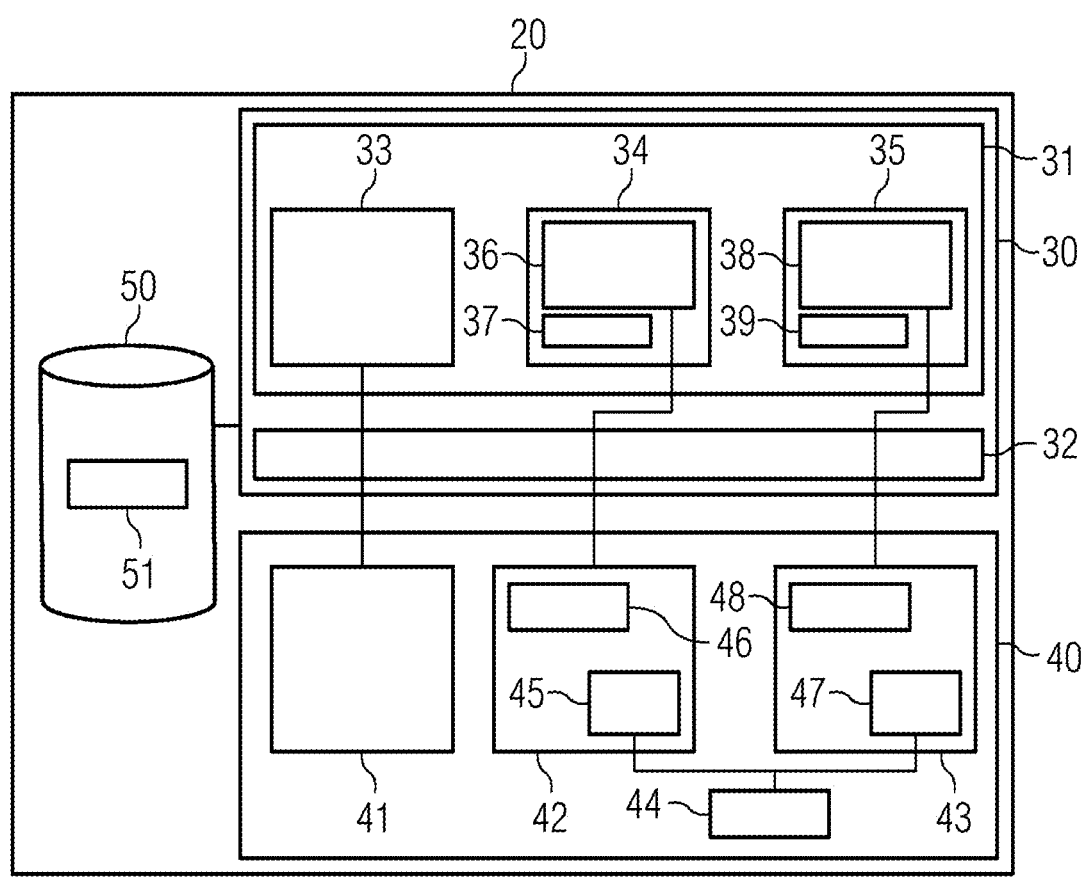
FIG. 1 schematically illustrates a system according to an embodiment.

In the following, embodiments are described in detail with reference to the accompanying drawings. It is to be understood that the following description of embodiments is not to be taken in a limiting sense. The scope of the disclosure is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. Functional blocks may be implemented in hardware, firmware, software, or a combination thereof. Same reference signs in the various drawings refer to similar or identical components.

FIG. 1 schematically illustrates a system 20 including a processing unit 30, an integrated circuit 40 including a plurality of field-programmable integrated parts 42 and 43, and a memory 50. The system 20 may be realized as a system on a chip (SOC), an application specific integrated circuit (ASIC), or a printed circuit board (PCB). The system 20 may be an embedded device, for example, an embedded industrial device. The processing unit 30 may include a central processing unit (CPU) or a controller, which is configured to execute software, for example, software stored in the memory 50. The memory 50 may include a read only memory (ROM), a random access memory (RAM), and/or a flash memory. The integrated circuit 40 may be realized as a field-programmable gate array (FPGA) or any other kind of programmable logic, for example, a complex programmable logic device (CPLD) or an ASIC with embedded FPGA or CPLD.

Apart from the software which may be executed by the processing unit 30, the memory 50 may provide a hardware configuration 51 which may be loaded into the field-programmable integrated parts 42 or 43. In particular, for each field-programmable integrated part 42 and 43, a corresponding hardware configuration 51 may be provided. The hardware configuration 51 may be considered as a hardware application, a so-called Hardware App (HW-App). The Hardware App may be part of an App Bundle including the Hardware App, one or more corresponding Software Apps, and additional configuration-/meta-data for the hardware and software components. Thus, reference sign 51 may also refer to an App Bundle including a package of a Hardware App and a Software App. For each field-programmable integrated part 42, 43, a corresponding App Bundle 51 may be provided in the memory 50.

The processing unit 30 may execute an operating system (OS) 32 including a kernel and application software in a user space 31 thus providing a basic software system. In the user space 31, Software Apps 34 and 35 of the aforementioned App Bundles may be executed. Each Software App 34, 35 may include program code 36 and 38, respectively. The program code 36, 38 of each Software App 34, 35 may be configured to download the associated Hardware App into the integrated circuit 40 and to communicate with the associated Hardware App. For downloading the Hardware App into the integrated circuit 40, a reconfiguration and update manager (RUM) 33 may be provided, which is configured to communicate with a partial reconfiguration (PR) logic 41 provided in the integrated circuit 40.

The integrated circuit 40 includes the field-programmable integrated parts 42 and 43 and the partial reconfiguration (PR) logic 41. The partial reconfiguration logic 41 may receive the hardware configurations for the field-programmable integrated parts 42 and 43 from the reconfiguration and update manager 33, configure the field-programmable integrated parts of 42 and 43 with the corresponding hardware configurations, and initiate operation of the field-programmable integrated parts 42 and 43 using the corresponding hardware configurations. The integrated circuit 40 may include any number of field-programmable integrated parts such as one or two field-programmable integrated parts or more than two field-programmable integrated parts, (e.g., three to ten or even in excess of ten field-programmable integrated parts).

The partial reconfiguration logic 41 may include a hardware system key (HW-SK), which may be accessible by the field-programmable integrated parts 42, 43 or which may be included in the hardware configuration by the partial reconfiguration logic 41 during loading the hardware configuration in the corresponding field-programmable integrated part 42, 43. The hardware system key may not be accessible from outside the integrated circuit 40 and may therefore be considered as a secret key.

The integrated circuit 40 may furthermore provide a hardware identifier, for example, a hardware serial number (HW-SN). The hardware serial number may be accessible by or included in the field-programmable integrated parts 42, 43. Furthermore, the integrated circuit 40 may provide a secret system parameter (HW-SP) which is accessible by the field-programmable integrated parts, but not accessible from outside the integrated circuit 40. The hardware system key, the hardware serial number, and the system parameter may thus be considered as hardware related information referred to by reference sign 44 in FIG. 1.

The hardware configurations loaded into the field-programmable integrated parts 42 and 43 may each include a corresponding evaluation part 45 and 47, respectively, which realizes a functionality for deriving cryptographic keys based on, for example, the hardware related information 44. The evaluation parts 45 and 47 may additionally consider hardware configuration related information for deriving cryptographic keys. The hardware configuration related information may include a hardware application identifier (HW-App-ID) 46 and 48, which is assigned to the corresponding hardware configuration and uniquely identifies the hardware configuration. The hardware configuration related information may furthermore include key information related to the bitstream of the hardware configuration (HW-BK). For example, a fingerprint of the bitstream of the hardware configuration may be generated either by the Software App 34, 35, related to the Hardware App, the RUM 33, or the reconfiguration logic 41 during loading the hardware configuration into the integrated circuit 40, or a specific part of the bitstream of the hardware configuration may be defined either by the Software App 34, 35, the RUM 33, or the reconfiguration logic 41 during loading the hardware configuration into the integrated circuit 40. The bitstream related key information is indicated in FIG. 1 by reference signs 37 and 39, respectively. The fingerprint or the specific part of the bitstream may be considered by the evaluation parts 45 and 47, respectively, when deriving cryptographic keys.

The Hardware Apps operated in the field-programmable integrated parts 42, 43 may use the above described hardware configuration related information 37, 39, 46, 48 and hardware related information 44 during a key management with another entity. As described above, this information may be derived directly by the hardware application from its environment, or it may be provided by the software application associated to the hardware application. In particular, this information may be used when deriving keys for authentication and key agreement. This may bind the negotiated keys to the corresponding hardware application and thus to the corresponding hardware. This may assure that the key agreement is performed indeed in the specific hardware, (e.g., via the hardware related information 44), which is available to the Hardware Apps. This may be used in protecting the communication between two Hardware Apps. Protection may include confidentiality and integrity protection of messages exchanged between the Hardware Apps. In addition, this may be used for encrypting data of a Hardware App which is to be stored outside the Hardware App, for example, in the memory 50.

In addition, Hardware Apps may use information available in the hardware for key management for the negotiation of session keys. The information in the hardware may be bound to the hardware or the Hardware App in order to have a unique assignment.

For example, the hardware application derives the hardware application specific key based on a combination of one or more of the above described information, e.g., the hardware configuration related information and the hardware related information. For example, a hash function may be calculated based on a combination of the above described information. Further, key derivation functions like HKDF or PBKDF2 may be used, or keyed Hash functions like HMAC-SHA256, or symmetric algorithms, for example, AES-128-GMAC. For example, the hardware system key may be used and applied to some or all of the other information.

The thus derived hardware application specific key may be used in a key establishment with a key agreement protocol like, for example, Diffie Hellman generating a shared known Diffie Hellman secret. Based on the thus derived Diffie Hellman secret, further keys, (e.g., direction specific keys for a corresponding connection of the hardware application with another entity), may be derived.

Various examples for operating the system 20 are described in the following with reference to FIG. 2 to FIG. 4.

Figure 2:
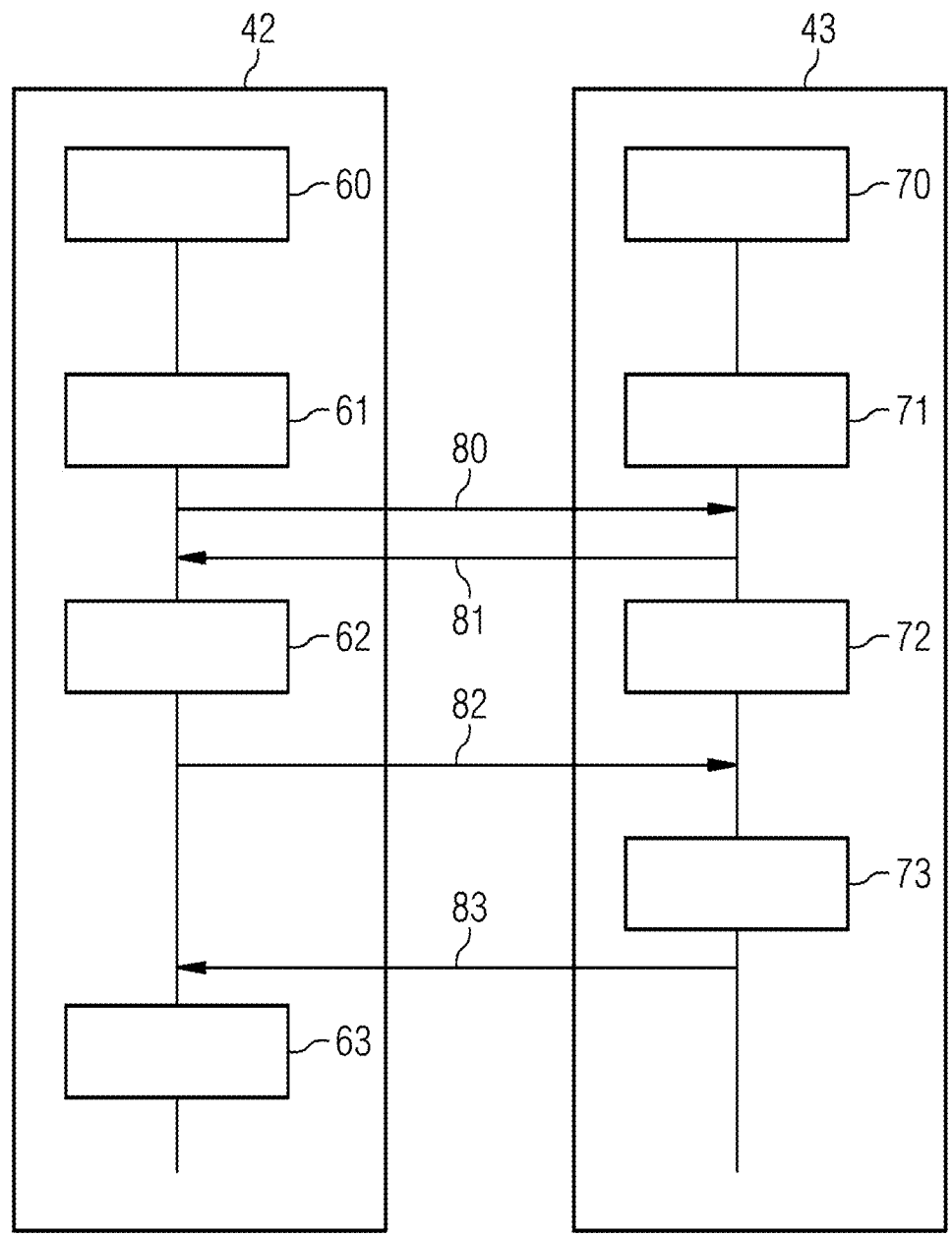
FIG. 2 schematically illustrates a flowchart of a method according to various examples.

FIG. 2 shows method acts performed in the field-programmable integrated part 42 by a corresponding Hardware App and method acts performed in the field-programmable integrated part 43 by a corresponding Hardware App. In this example, the non-authenticated Diffie Hellman key agreement is performed. The hardware application is authenticated by use of derived keys after the Diffie Hellman key agreement.

In detail, in block 60, the hardware configuration for the field-programmable integrated part 42 is loaded into the field-programmable integrated part 42. The hardware configuration may be stored in the memory 50 from which it is downloaded via the reconfiguration and update manager 33 and the partial reconfiguration logic 41 into the field-programmable integrated part 42. The hardware configuration includes the above described evaluation part 45 which are named the following also key derivation functionality 45.

In block 61, operation of the hardware configuration in the field-programmable integrated part 42 causes that a cryptographic key is derived based on the information in the field-programmable integrated part 42 using the key derivation functionality 45. The information may include at least one of the above described hardware configuration related information and hardware related information 44, e.g., the hardware identifier, the hardware system key, the secret system parameter, the bitstream related key information, and the hardware application identifier. The cryptographic key may furthermore be derived based on Diffie Hellman system parameters. The thus derived cryptographic key is specific for the Hardware App of the field-programmable integrated part 42 and will therefore in the following be referred to as HW-App-Key1. In addition to HW-App-Key1, a public Diffie Hellman key (DH-HWA1-public) and a private Diffie Hellman key (DH-HWA1-private) may be generated to be applied in a later act in a Diffie Hellman key agreement protocol.

Likewise, in block 70, the hardware configuration for the field-programmable integrated part 43 is loaded into the field-programmable integrated part 43, for example, from the memory 50 via the reconfiguration and update manager 33 and the partial reconfiguration logic 41. The hardware configuration for the field-programmable integrated part 43 also includes a key derivation functionality in the evaluation part 47.

In block 71, operation of the hardware configuration in the field-programmable integrated part 43 causes that a cryptographic key is derived based on information in the field-programmable integrated part 43 using the key derivation functionality 47. The information may include at least one of the above described hardware configuration related information and hardware related information 44, e.g., the hardware identifier, the hardware system key, the secret system parameter, the bitstream related key information, and the hardware application identifier. The cryptographic key may furthermore be derived based on Diffie Hellman system parameters. The thus derived cryptographic key is specific for the Hardware App of the field-programmable integrated part 43 and will therefore in the following be referred to as HW-App-Key2. In addition to HW-App-Key2, a public Diffie Hellman key (DH-HWA2-public) and a private Diffie Hellman key (DH-HWA2-private) may be generated to be applied in a Diffie Hellman key agreement protocol in a later act.

Next, according to the Diffie Hellman key agreement protocol, a Diffie Hellman request 80 may be transmitted from the field-programmable integrated part 42 to the field-programmable integrated part 43. The Diffie Hellman request message 80 may include at least one of the hardware application identifier of the field-programmable integrated part 42 (HW-App-ID1), the DH-HWA1-public, and a first nonce generated by the field-programmable integrated part 42.

The field-programmable integrated part 43 may transmit a Diffie Hellman response message 81 to the field-programmable integrated part 42. Diffie Hellman response message 81 may include at least one of the hardware application identifier of the field-programmable integrated part 43 (HW-App-ID2), the DH-HWA2-public, and a second nonce generated by the field-programmable integrated part 43.

In block 62 the field-programmable integrated part 42 may determine a Diffie Hellman secret (DH-S) according to the Diffie Hellman key agreement protocol and the information provided in the response from the field-programmable integrated part 43. Based on the hardware application identifier (HW-App-ID1) transmitted as part of the Diffie Hellman key agreement protocol, the field-programmable integrated part 42 may derive the HW-App-Key2 of the field-programmable integrated part 43. Furthermore, the field-programmable integrated part 42 may derive direction specific session keys. For example, based on the Diffie Hellman secret and HW-App-Key1, a direction specific session key SK-HWA1 for a communication from the field-programmable integrated part 42 to the field-programmable integrated part 43 may be derived. Furthermore, based on the Diffie Hellman key agreement protocol, the hardware related information, for example, the hardware system parameter (HW-SP), and the derived HW-App-Key2 of the field-programmable integrated part 43, a direction specific session key SK-HWA2 for a communication from the field-programmable integrated part 43 to the field-programmable integrated part 42 may be derived.

Likewise, in block 72 the field-programmable integrated part 43 may determine the Diffie Hellman secret (DH-S) according to the Diffie Hellman key agreement protocol and the information provided in the request from the field-programmable integrated part 42. Based on the hardware application identifier (HW-App-ID2) transmitted as part of the Diffie Hellman key agreement protocol, the field-programmable integrated part 43 may derive the HW-App-Key1 of the field-programmable integrated part 42. Furthermore, the field-programmable integrated part 43 may derive direction specific session keys. For example, based on the Diffie Hellman secret and HW-App-Key2, a direction specific session key SK-HWA2 for the communication from the field-programmable integrated part 43 to the field-programmable integrated part 42 may be derived. Furthermore, based on the Diffie Hellman secret, the hardware related information, for example, the hardware system parameter (HW-SP), and the derived HW-App-Key1 of the field-programmable integrated part 42, the direction specific session key SK-HWA1 for the communication from the field-programmable integrated part 42 to the field-programmable integrated part 43 may be derived.

Thus, the field-programmable integrated part 42 and the field-programmable integrated part 43 share the Diffie Hellman secret, the hardware application specific keys HW-App-Key1 and HW-App-Key2, and the direction specific session keys SK-HWA1 and SK-HWA2.

Messages and data may be communicated using the direction specific session keys.

For example, a request 82 including an integrity check value (IVC) using the session key SK-HWA1 may be transmitted from the field-programmable integrated part 42 to the field-programmable integrated part 43. In block 73, the field-programmable integrated part 43 may verify the ICV using the calculated SK-HWA1. Likewise, the field-programmable integrated part 43 may transmit a response 83 including an integrity check value (IVC) using the session key SK-HWA2 to the field-programmable integrated part 42. In block 63 the field-programmable integrated part 42 may verify the received ICV using the calculated SK-HWA2.

In further examples, based on the direction specific keys SK-HWA1 and SK-HWA2, further security service specific keys may be derived, for example, separate keys for integrity protection and confidentiality. In further examples, instead of direction specific keys only one communication key may be derived, which may be used by both, the field-programmable integrated part 42 and to the field-programmable integrated part 43, for sending and receiving messages and data.

Figure 3:
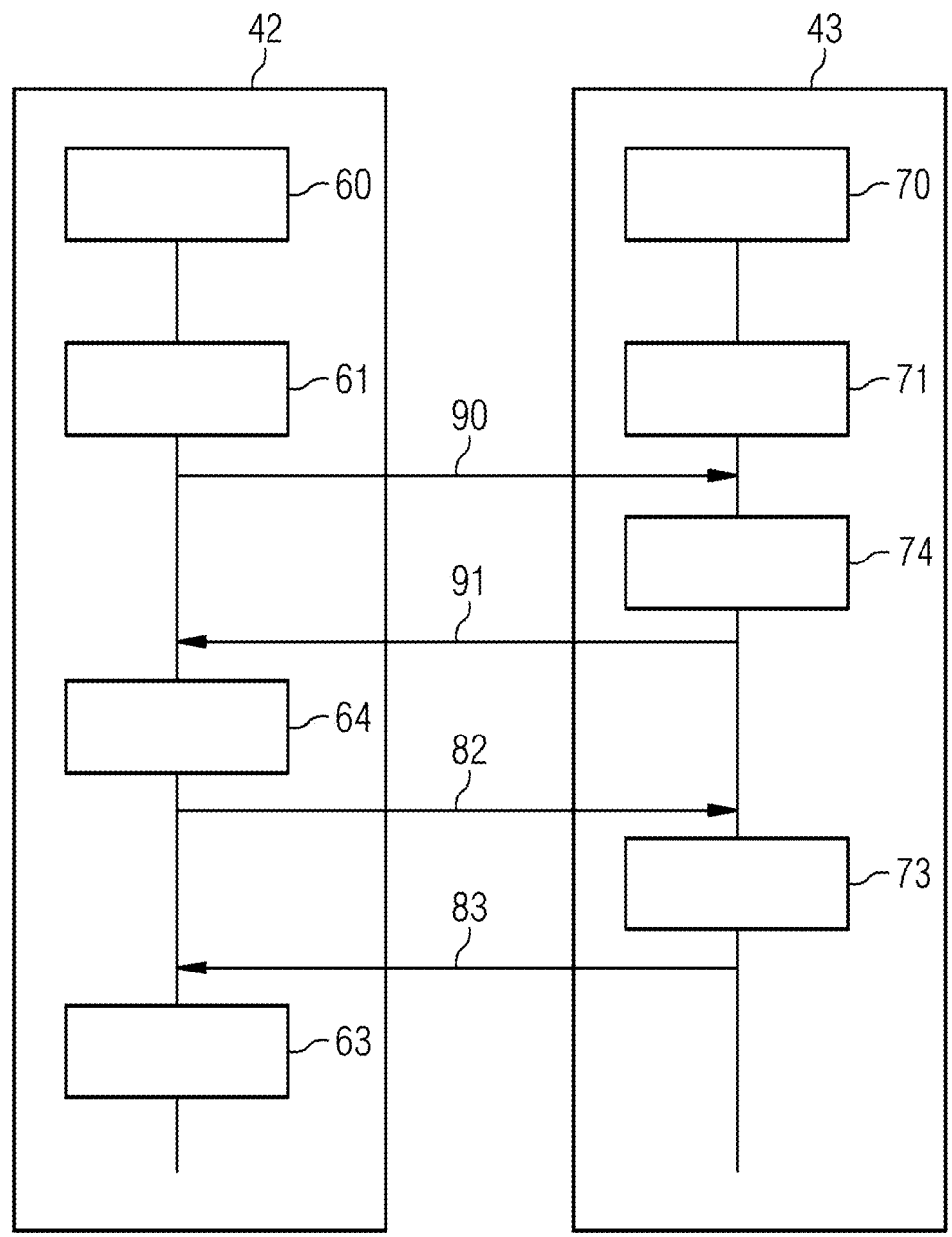
FIG. 3 schematically illustrates a flowchart of a method according to further examples.

A further example is shown in FIG. 3. In this example, the derived keys HW-App-Key1 and HW-App-Key2 are used for protecting the Diffie Hellman key agreement protocol.

In blocks 60, 61, 63, 70, 71, and 73 the same operations are performed as described above in connection with FIG. 2. Therefore, these blocks will not be explained in detail in the following for reasons of brevity.

In block 60, the hardware configuration for the field-programmable integrated part 42 is loaded into the field-programmable integrated part 42. In block 61, operation of the hardware configuration in the field-programmable integrated part 42 causes that the cryptographic key HW-App-Key1 is derived based on information in the field-programmable integrated part 42 using the key derivation functionality 45. In addition to HW-App-Key1, the public Diffie Hellman key (DH-HWA1-public) and the private Diffie Hellman key (DH-HWA1-private) may be generated to be applied in a Diffie Hellman key agreement protocol.

Likewise, in block 70, the hardware configuration for the field-programmable integrated part 43 is loaded into the field-programmable integrated part 43. In block 71, operation of the hardware configuration in the field-programmable integrated part 43 causes that the cryptographic key HW-App-Key2 is derived based on information in the field-programmable integrated part 43 using the key derivation functionality 47. In addition to HW-App-Key2, the public Diffie Hellman key (DH-HWA2-public) and the private Diffie Hellman key (DH-HWA2-private) may be generated to be applied in a Diffie Hellman key agreement protocol.

Next, according to the Diffie Hellman key agreement protocol, a Diffie Hellman request 90 may be transmitted from the field-programmable integrated part 42 to the field-programmable integrated part 43. The Diffie Hellman request 90 may include at least one of the hardware application identifier of the field-programmable integrated part 42 (HW-App-ID1), the DH-HWA1-public, and a first nonce generated by the field-programmable integrated part 42. The Diffie Hellman request 90 may be integrity protected using the cryptographic key HW-App-Key1. For example, an integrity check value (IVC) may be calculated based on the HW-App-Key1 and included in the request 90.

In block 74, the field-programmable integrated part 43 may determine the Diffie Hellman secret (DH-S) according to the Diffie Hellman key agreement protocol and the information provided in the request 90 from the field-programmable integrated part 42. Based on the hardware application identifier (HW-App-ID1) transmitted as part of the Diffie Hellman request message, the field-programmable integrated part 43 may derive the HW-App-Key1 of the field-programmable integrated part 42. Based on the HW-App-Key1 the field-programmable integrated part 43 may verify integrity of the received request 90, for example, based on the integrity check value (ICV) included in the request 90.

The field-programmable integrated part 43 may derive direction specific session keys. For example, based on the Diffie Hellman secret and HW-App-Key2, a direction specific session key SK-HWA2 for the communication from the field-programmable integrated part 43 to the field-programmable integrated part 42 may be derived. Furthermore, based on the Diffie Hellman secret, the hardware related information, for example, the hardware system parameter (HW-SP), and the derived HW-App-Key1 of the field-programmable integrated part 42, a direction specific session key SK-HWA1 for the communication from the field-programmable integrated part 42 to the field-programmable integrated part 43 may be derived.

The field-programmable integrated part 43 may transmit a Diffie Hellman response 91 to the field-programmable integrated part 42. Diffie Hellman response 91 may include at least one of the hardware application identifier of the field-programmable integrated part 43 (HW-App-ID2), the DH-HWA2-public, and a second nonce generated by the field-programmable integrated part 43. The Diffie Hellman response 91 may be integrity protected using the cryptographic key HW-App-Key2. For example, an integrity check value (IVC) may be calculated based on the HW-App-Key2 and included in the response 91.

In block 64, the field-programmable integrated part 42 may determine the Diffie Hellman secret (DH-S) according to the Diffie Hellman key agreement protocol and the information provided in the response from the field-programmable integrated part 43. Based on the hardware application identifier (HW-App-ID2) transmitted as part of the Diffie Hellman response message, the field-programmable integrated part 42 may derive the HW-App-Key2 of the field-programmable integrated part 43. Based on the HW-App-Key1 the field-programmable integrated part 42 may verify integrity of the received response 91, for example, based on the integrity check value (ICV) included in the response 91.

The field-programmable integrated part 42 may derive direction specific session keys. For example, based on the Diffie Hellman secret and HW-App-Key1, a direction specific session key SK-HWA1 for the communication from the field-programmable integrated part 42 to the field-programmable integrated part 43 may be derived. Furthermore, based on the Diffie Hellman secret, the hardware related information, for example, the hardware system parameter (HW-SP), and the derived HW-App-Key2 of the field-programmable integrated part 43, a direction specific session key SK-HWA2 for the communication from the field-programmable integrated part 43 to the field-programmable integrated part 42 may be derived.

Messages and data may be communicated using the direction specific session keys SK-HWA1 and SK-HWA2, for example, as described above in connection with request 82, block 73, response 83, and block 63.

Figure 4:
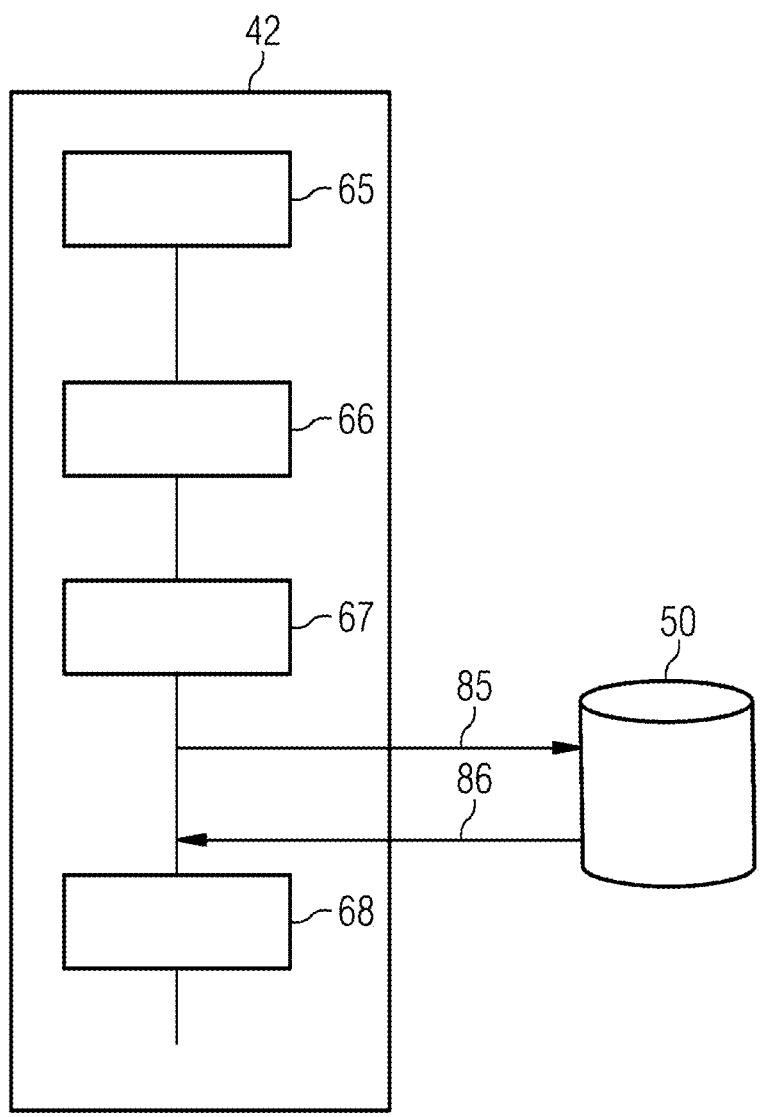
FIG. 4 schematically illustrates a flowchart of a method according to further examples.

FIG. 4 shows a further example of deriving and using a cryptographic key in the field-programmable circuit part 42.

In block 65, the hardware configuration for the field-programmable integrated part 42 is loaded into the field-programmable integrated part 42. The hardware configuration may be stored in the memory 50 from which it is downloaded via the reconfiguration and update manager 33 and the partial reconfiguration logic 41 into the field-programmable integrated part 42. The hardware configuration includes the above described evaluation part 45, e.g., the key derivation functionality.

In block 66, operation of the hardware configuration in the field-programmable integrated part 42 causes that a cryptographic key is derived based on the information in the field-programmable integrated part 42 using the key derivation functionality 45. The information may include at least one of the above described hardware configuration related information and hardware related information 44, e.g., the hardware identifier, the hardware system key, the secret system parameter, the bitstream related key information, and the hardware application identifier. The thus derived cryptographic key is specific for the Hardware App of the field-programmable integrated part 42 and are referred to as HW-App-Key.

In block 67, data and messages provided or generated in the field-programmable circuit part 42, which are to be stored in the memory 50, may be integrity protected using the HW-App-Key. Additionally, or as an alternative, the data and messages may be encrypted using the HW-App-Key. Although in this example the memory 50 is used for storing the data and messages and the hardware configuration 51, different memories may be used, for example, a first memory for providing the hardware configuration 51 and a second memory for storing the data and messages, wherein the second memory is different from the first memory. In particular, the first and second memory may include separate memory devices which may be arranged inside or outside the system 20.

The thus integrity protected and/or encrypted data and messages may be transmitted as indicated by reference sign 85 to the memory 50. For example, the data and messages may be communicated from the field-programmable circuit part 42 to the associated Software App 34 and the Software App 34 may transmit the data and messages via the operating system 32 to the memory 50.

At a later point in time, the field-programmable integrated part 42 may want to retrieve the stored data and messages. Upon request from the field-programmable integrated part 42, the integrity protected and/or encrypted data and messages may be communicated from the memory 50 to the field-programmable integrated part 42 as indicated by reference sign 86. For example, the data and messages may be retrieved from the memory 50 by the operating system 32 and may be communicated from the operating system 32 via the Software App 34 to the field-programmable circuit part 42.

In block 68, the field-programmable circuit part 42 may decrypt the received data and messages using the HW-App-Key. Additionally, or as an alternative, the field-programmable circuit part 42 may verify integrity of the received data messages using the HW-App-Key.

In summary, keys created in the context of a Hardware App may be recognized accordingly. This enables, for example, the enforcement of security policies that take certain requirements into account when generating session keys. By binding the keys to system-specific parameters, copying a Hardware App to another hardware may be prevented, leading to a different result, and being recognized by the communication partner.

Although the disclosure has been illustrated and described with respect to certain embodiments, equivalents and modifications will occur to others skilled in the art upon the reading and understanding of the specification. The present disclosure includes all such equivalents and modifications and is limited only by the scope of the appended claims.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for key management in a field-programmable integrated part of an integrated circuit, the method comprising:
   loading a hardware configuration for the field-programmable integrated part into the field-programmable integrated part, wherein the hardware configuration comprises a key derivation functionality; and
   deriving, by operation of the hardware configuration in the field-programmable integrated part using the key derivation functionality, a cryptographic key based on information provided in the field-programmable integrated part,
   wherein the information in the field-programmable integrated part comprises a fingerprint of a bitstream of the hardware configuration.

2. The method of claim 1, wherein the hardware configuration comprises a control functionality for controlling, using the cryptographic key, operation of an application implemented by the field-programmable integrated part.

3. The method of claim 1, wherein the information provided in the field-programmable integrated part further comprises:
   a hardware application identifier comprised in the hardware configuration loaded into the field-programmable integrated part,
   a hardware system key provided by an application executed by a logic coupled to the field-programmable integrated part,
   a secret system parameter comprised in the field-programmable integrated part, or combinations thereof.

4. The method of claim 1, further comprising:
   performing a cryptographic operation in the field-programmable integrated part using the derived cryptographic key.

5. The method of claim 4, further comprising:
   generating encrypted data in the field-programmable integrated part using the cryptographic key; and
   transmitting the encrypted data to a memory remote from the field-programmable integrated part.

6. The method of claim 4, further comprising:
   receiving encrypted data from a memory remote from the field-programmable integrated part; and
   decrypting the encrypted data in the field-programmable integrated part using the cryptographic key.

7. The method of claim 1, wherein the deriving of the cryptographic key comprises applying a hash function on the information provided in the field-programmable integrated part.

8. The method of claim 1, further comprising:
   generating encrypted data in the field-programmable integrated part using the cryptographic key; and
   transmitting the encrypted data to a memory remote from the field-programmable integrated part.

9. The method of claim 1, further comprising:
   receiving encrypted data from a memory remote from the field-programmable integrated part; and
   decrypting the encrypted data in the field-programmable integrated part using the cryptographic key.

10. The method of claim 1, wherein the field-programmable integrated part represents a first field-programmable integrated part of the integrated circuit, the method further comprising:
    loading a further hardware configuration into a second field-programmable integrated part of the integrated circuit, wherein the further hardware configuration comprises a further key derivation functionality; and
    deriving, by the further key derivation functionality, a further cryptographic key based on further information provided in the second field-programmable integrated part.

11. The method of claim 10, further comprising:
    generating a session key for protecting messages communicated between the first field-programmable integrated part and the second field-programmable integrated part using a key agreement protocol in the first field-programmable integrated part and the second field-programmable integrated part.

12. The method of claim 11, wherein the session key comprises:
    a first directional session key for protecting messages communicated from the first field-programmable integrated part to the second field-programmable integrated part,
    a second directional session key for protecting messages communicated from the second field-programmable integrated part to the first field-programmable integrated part, or
    combinations thereof.

13. The method of claim 12, further comprising:
protecting messages of the key agreement protocol communicated from the first field-programmable integrated part to the second field-programmable integrated part using the cryptographic key,
protecting messages of the key agreement protocol communicated from the second field-programmable integrated part to the first field-programmable integrated part using the further cryptographic key, or
combinations thereof.

14. The method of claim 13, wherein the protecting of the messages comprises encrypting the messages, decrypting the messages, protecting integrity of the messages, or combinations thereof.

15. The method of claim 11, further comprising:
protecting messages of the key agreement protocol communicated from the first field-programmable integrated part to the second field-programmable integrated part using the cryptographic key,
protecting messages of the key agreement protocol communicated from the second field-programmable integrated part to the first field-programmable integrated part using the further cryptographic key, or
combinations thereof.

16. The method of claim 11, wherein the protecting of the messages comprises encrypting the messages, decrypting the messages, protecting integrity of the messages, or combinations thereof.

17. A system comprising:
a field-programmable integrated part of an integrated circuit,
wherein the field-programmable integrated part is configured to:
load a hardware configuration for the field-programmable integrated part into the field-programmable integrated part, the hardware configuration comprising a key derivation functionality enabling the field-programmable integrated part to perform a key derivation function, and
derive, by operation of the hardware configuration in the field-programmable integrated part using the key derivation functionality, a cryptographic key based on information provided in the field-programmable integrated part,
wherein the information in the field-programmable integrated part comprises a fingerprint of a bitstream of the hardware configuration.

18. The system of claim 17, wherein the system is configured to:
generate encrypted data in the field-programmable integrated part using the cryptographic key and transmit the encrypted data to a memory remote from the field-programmable integrated part; or
receive the encrypted data from the memory and decrypt the encrypted data in the field-programmable integrated part using the cryptographic key.

19. A non-transitory hardware configuration for a field-programmable integrated part of an integrated circuit, which is configured to be loaded into the field-programmable integrated part, wherein the non-transitory hardware configuration causes the field-programmable integrated part to:
derive, by operation of the non-transitory hardware configuration in the field-programmable integrated part using a key derivation functionality of the non-transitory hardware configuration, a cryptographic key based on information provided in the field-programmable integrated part,
wherein the information in the field-programmable integrated part comprises a fingerprint of a bitstream of the non-transitory hardware configuration.

\* \* \* \* \*